United States Patent [19]

Fritts

[11] 4,177,369

[45] Dec. 4, 1979

[54] DIGITALLY PROGRAMMED MICROWAVE OVEN

[75] Inventor: Rex E. Fritts, Cedar Rapids, Iowa

[73] Assignee: Amana Refrigeration, Inc., Amana, Iowa

[21] Appl. No.: 872,719

[22] Filed: Jan. 26, 1978

Related U.S. Application Data

[63] Continuation of Ser. No. 671,527, Mar. 29, 1976, abandoned.

[51] Int. Cl.² .............................................. H05B 9/06
[52] U.S. Cl. ............................... 219/10.55 B; 323/24; 323/34
[58] Field of Search .................. 219/10.55 B, 10.55 R, 219/10.55 M; 340/366 B, 172.5; 126/275 E; 323/16, 18, 19, 24, 34, 40

[56] References Cited

U.S. PATENT DOCUMENTS

| | | | |
|---|---|---|---|
| 3,691,452 | 9/1972 | Aguiar | 323/19 |
| 3,932,723 | 1/1976 | Tamano et al. | 219/10.55 M |
| 4,001,536 | 1/1977 | Eberhardt, Jr. | 219/10.55 B |
| 4,011,428 | 3/1977 | Fosnough et al. | 219/10.55 B |

*Primary Examiner*—Arthur T. Grimley
*Attorney, Agent, or Firm*—M. D. Bartlett; J. D. Pannone; H. W. Arnold

[57] ABSTRACT

A digitally programmed microwave oven having a microwave generator energized by a high voltage power supply connected to an alternating current source through mechanically actuated oven door interlock switches, with the power supply regulating the current supplied to the microwave generator to compensate for peak voltage variations in the alternating current source by resonating the output of the power supply in the region of the frequency of the alternating current source in which the power supply is initially energized by a semiconductor switch actuated by a computer to accurately control the time of initial supply of power to said power supply at a point which minimizes the input current surge to said resonant circuit by actuating said semiconductor switch at a time substantially $\pi/2$ radians of said frequency after the zero voltage point of said alternating current source.

10 Claims, 2 Drawing Figures

DIGITALLY PROGRAMMED MICROWAVE OVEN

CROSS REFERENCE TO RELATED CASES

This is a continuation of application Ser. No. 671,527, filed Mar. 29, 1976, now abandoned.

BACKGROUND OF THE INVENTION

Digital timers for heating purposes have been previously used such as, for example, in electrical resistance stoves. However, in such devices, digital timers perform no more than would be performed by a plurality of conventional mechanical timers since the response time to change cooking functions is limited by the time necessary to heat up and/or cool down a resistive heating element. In addition, due to the resistive nature of the load, the current from a source is substantially uniform.

In cooking systems where heat is supplied by other than resistive heating elements, such as microwave cookers, reactive components of the power supply can produce conditions where current surges of the input power line will blow fuses and/or damage interlock structures. Conventional methods of eliminating such surges have generally relied on the use of reduced voltage starting to limit the initial surge with a mechanical switch shorting out a voltage reducing resistor.

In addition, in microwave cookers, interlock systems are required whose reliability may be reduced by repeated current surges eventually causing the mechanical interlock switches to stick closed or to fail to make contact. Some attempts to minimize such current surges by phase control of AC power switches such as triacs have produced conditions where such current surges are higher than surges produced under average conditions and, hence, require excessively large fuses and interlock current switches. More specifically, if the load supplied is the transformer of a power supply for energizing a microwave cooker magnetron, the condition of the transformer when power is first supplied thereto is important since there may be residual saturation conditions in the transformer so that if it is driven a full excursion from positive to negative, it will drive into saturation with only half the voltage applied thereby becoming a low impedance during the remainder of the current pulse and drawing a substantial current surge.

SUMMARY OF THE INVENTION

In accordance with this invention, applicant has discovered that since a microwave heating system can change the heating rate extremely rapidly from no heat to full heat, digital control can produce such heat response in any desired fashion to enhance cooking or defrosting rates and/or cooking patterns.

In addition, the same high repetition rate clock can be used to time power supply functions for a microwave cooker power supply which, in the interests of cost, usually has a starting current surge characteristic so that the current surge characteristic is substantially reduced thereby allowing the microwave cooking equipment to be used on the same home circuit simultaneously with other equipment, such as toasters or electric hot plates, without blowing fuses.

More specifically, this invention discloses firing a triac in a predetermined phase position with respect to an input power wave to minimize the surge during the first cycle thereby presenting a high surge impedance to the input power line.

This invention further provides for supplying power for a safety circuit for the system in which a digital timing system has function initiated and/or terminated by closing and opening an interlock actuated by a door of the microwave oven so that the supply of microwave energy will be terminated in the event that the door is inadvertently opened during the cooking cycle so that leakage of microwave energy from the oven is minimized.

In accordance with this invention, the input power to the power supply is turned on approximately at the peak of the input voltage. This corresponds to a reduced current condition through the transformer primary winding due to the reactive nature of the load. Hence, the current is driven in a normal half wave excursion and does not produce an abnormal excursion.

More specifically, the inductance of the secondary winding has a reactance of the same order of magnitude as the reactance of the output load capacitance, and the resistance of the magnetron during conduction is greater than said reactances at the frequency of the alternating current source so that in the absence of current drawn by the magnetron, a voltage buildup in the secondary or high voltage winding occurs which is equal to the unsaturated or no load output voltage of the transformer.

BRIEF DESCRIPTION OF THE DRAWINGS

Other and further objects and advantages of the invention will become apparent as the description thereof progresses, reference being had to the accompanying drawings wherein.

DESCRIPTION OF THE PREFERRED EMBODIMENT

Figure 1:
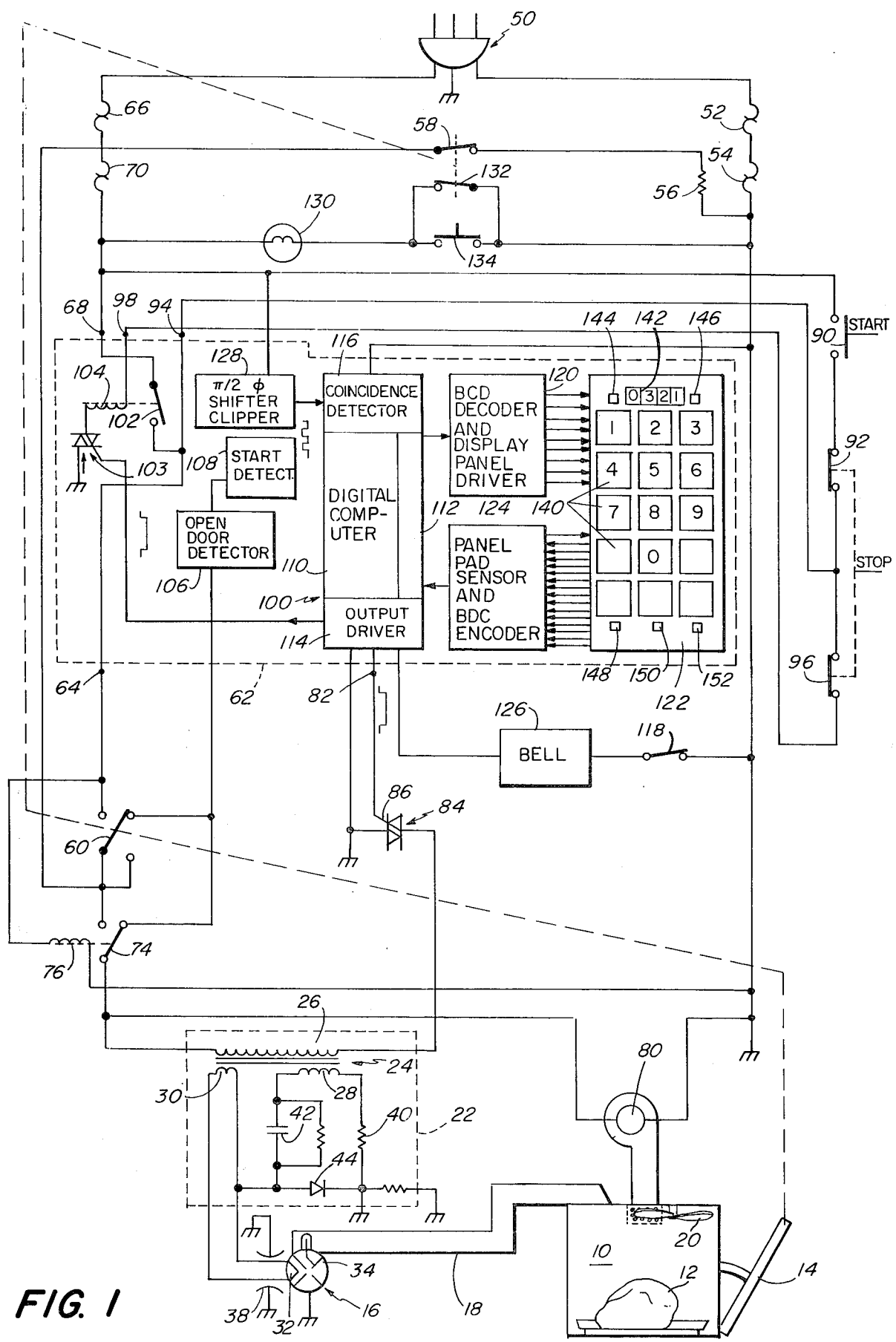
FIG. 1 illustrates a microwave oven control system embodying the invention.
Figure 2:
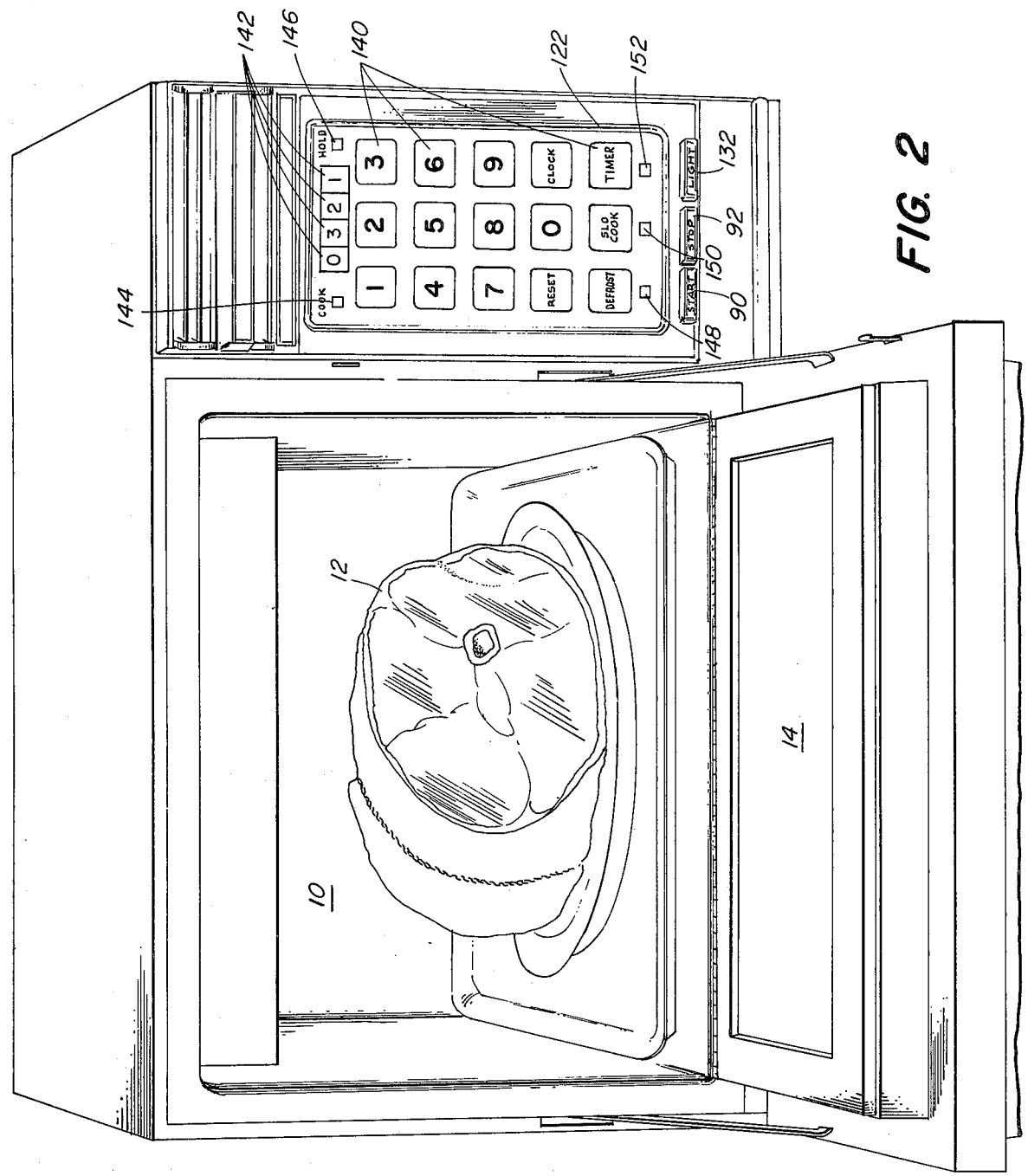
FIG. 2 illustrates a microwave oven utilizing the system of FIG. 1.

Referring now to FIGS. 1 and 2, there is shown a microwave oven cavity 10 having a food body 12 positioned therein through a door 14 supplied with microwave energy from a magnetron 16 via a waveguide 18. While the magnetron 16 may generate microwave energy of any desired frequency, a frequency of 2.45 KMHz is preferred. The cooking cavity 10 has internal dimensions which are many times the free space wavelength of said frequency so that many different resonant modes may be produced therein, and such modes may be cyclically distributed by a mode stirrer 20 driven by any desired means in accordance with well-known practice.

Magnetron 16 is supplied with power at a voltage of, for example, 4000 volts from a high voltage power supply 22 comprising a transformer 24 having a primary winding 26, a high voltage secondary winding 28 and a filament winding 30. Filament winding 30 is connected to the filament 32 of the magnetron 16 whose anode 34 is grounded, and any spurious oscillations emanating from the magnetron 16 via the leads to the cathode 32 are suppressed by capacitors 38. The high voltage winding 28 has one end connected to ground through a current sensing resistor 40 and to filament winding 30 through an energy storage condenser 42 to one side of magnetron filament 32. A half wave rectifier 44 is connected from ground to the same side of the filament 32 as the condenser 42, with the rectifier 44 being poled such that when the ungrounded end of winding 28 is positive, current flows through rectifier 44 to charge condenser 42, and when the voltage across winding 28 reverses, filament 32 is driven negative to cause conduction of magnetron 16, partially discharging condenser 42. Operation of such a high voltage circuit for magnetron power supplies is shown in greater detail in U.S. Pat. No. 3,396,342 in which the transformer is preferably selected to have saturation characteristics at the maximum desired voltage to at least partially compensate for changes in the input voltage level to the primary winding and/or different secondary load conditions occurring, for example, during warm-up or throughout the life of the magnetron.

Power is supplied to input winding 26 from a conventional 110 volt 60 cycle source to a plug 50. One side of plug 50 is connected to one side of a thermally actuated element 52 which is heated by the resistor 40 so that in the event excess current is drawn by the magnetron 16 or other elements of the power supply 22 for more than a predetermined time, thermal energy generated by resistor 40 will cause element 52 to open thereby de-energizing the circuit. The other side of element 52 is connected to one side of a similar thermally actuated element 54, and the other side of element 54 is connected through a resistor 56 which is adjacent to element 54 and which will transfer heat thereto if current flows through resistor 56 when the oven is energized. The other end of resistor 56 is connected through an interlock switch 58 actuated by the door 14 and opened when the door 14 is closed. The opposite terminal of switch 58 from that connected to resistor 56 is connected to a second interlock switch 60 actuated by door 14. When the door 14 is closed, switch 60 contacts terminal 64 of control circuit 62.

The other side of the plug 50 from that connected to protection element 52 is connected to one side of a thermally actuated protection element 66 mounted on, or adjacent to, the anode 34 of magnetron 16 and adapted to open if the temperature of magnetron 16 exceeds a predetermined temperature. The other side of element 66 from that connected to the plug 50 is connected to a power input terminal 68 of control 62 through a protection element 70 located adjacent to and sensing the heating cavity 10. Control circuit 62 connects terminal 68 to terminal 64 when it is desired to energize the transformer 24 to supply microwave energy to the oven. The terminal 64 is connected to one end of transformer primary winding 26 through interlock switch 60 and a latch switch 74 mechanically actuated by a latch solenoid 76 which prevents the door 14 from being opened when solenoid 76 is energized. Solenoid 76 is connected between the grounded bus connected to thermal element 54 and terminal 64.

A blower motor 80 is connected between the grounded bus and the junction between latch switch 74 and winding 26 so that when motor 80 is energized by the circuit 62, the blower supplies cooling air to the magnetron 16 and also to the cavity 10 to turn a fan-shaped mode stirrer 20 rotatably supported on a shaft.

The end of winding 26 opposite to that connected to switch 74 is connected to ground through a semiconductor switch 84 such as a triac having a control electrode 86 to which a control signal is supplied from a terminal 82 of control circuit 62 when it is desired to energize transformer 24.

To initiate operation of the circuit, a normally open start button 90 is pushed to momentarily connect terminal 68 through a normally closed contact of a stop button 92 to a terminal 94 of circuit 62. Terminal 94 is connected through a second normally closed section 96 of the stop botton, mechanically ganged to section 92, to a terminal 98 of circuit 62 which actuates a relay in circuit 62 having a set of normally open contacts 102 actuated by a solenoid 104. Contacts 102 when closed supply power from terminal 68 to terminal 64 which energizes latch solenoid 76 and supplies power through interlock switch 60 and latch switch 74 to the ungrounded end of winding 26.

The position of the left interlock switch 60 and the latch interlock switch 74 is detected by additional contacts on those switches which are contacted by those switches when the door 14 is opened and the interlock switch 58 is closed, as shown in FIG. 2, thereby supplying a ground potential to an open door detect circuit 106 in control circuit 62. The output of circuit 106 prevents operation of a start detector circuit 108 supplied from terminal 94 when door 14 is open.

Upon pushing of the start button 90 with door 14 closed, power is supplied to latch solenoid 76, closing latch 74 and opening the contact of latch 74 connected to the circuit 106. The door 14 is then locked shut, and, since interlock switch 60 has been actuated to remove the ground from door detect circuit 106, a start signal is supplied to a digital computer 100 in circuit 62 which actuates relay solenoid 104 through a triac 103, closing relay contacts 102 to bypass the start button 90 thereby holding latch solenoid 76 energized until the program sequence of computer 100 ends, at which time solenoid 104 is de-energized, opening contacts 102, de-energizing latch solenoid 76 and permitting the door to be opened. Power to solenoid 104 is also interruptable by pushing ganged stop buttons 92 and 96.

From the foregoing, it may be seen that even upon failure of the digital computer circuit 100, the semiconductor switch 84 or the semiconductor switch 103, the oven once energized cannot be opened to produce radiation leakage until power is removed from the latch solenoid 76 which, under these circumstances, is directly in parallel with the input to the transformer 26. Accordingly, with such a circuit, multiple programming may be achieved using semiconductor circuitry while still retaining the fail-safe conditions of the mechanical interlock structures required by safety standards.

Digital computer 100 can be any general purpose digital computer having sufficient memory to retain the desired program and may be located either on the oven or, if desired, may be a central computer for a commissary supplying the cooking control programs. A special purpose computer could also be used with the particular digital components preferably selected from standard digital components in which large numbers of circuits having different functions are formed on a semiconductor chip and/or a plurality of semiconductor chips or formed on a substrate and packaged as a unit. It is also contemplated, however, that any of the conventional digital techniques employing core logic, bipolar semiconductor logic or MOS logic may be used.

Digital computer 100 is shown herein by way of example as having a digital computing section 110 which performs memory functions, programming functions, sequencing control functions and, for example, contains a master oscillator clock which may have a frequency of 100 KHz. A second section of the computer 100 is the display input and output section 112 which supplies data from the computer section 110 to a binary to a digital code display panel driver 120. The output of driver 120 provides light actuating signals to a plurality of regions 144 of display 122 indicating cooking functions and digital code to four locations on a four-position number display 142 which are connected to the appropriate number signals at unit 142.

Input program data signals, which are produced by touching panel pads 140 of display panel 122, are sensed by a panel pad sensor and binary to decimal encoder 124 which supplies a level sensing signal to all the pads 140. The sensed pad causes data identifying the pad in digital form to be sent to section 112 of the computer 100.

An output drive section 114 of computer 100 energizes the semiconductor switches 103 and 84 as well as a bell alarm 126 to indicate the end of the cycle. Alarm 126 may be de-energized by means of a switch 118, if desired.

A section 116 of computer 100 is a coincidence detector to which a square wave input is supplied from a phase shifter clipper 128 supplied with a 60 cycle sine wave voltage from terminal 68. The output signal from phase shifter clipper 128 which is a sine wave clipped to form said square wave is preferably delayed by 90° or $\pi/2$ radians, and is supplied to coincidence detector 116 where it is compared with clock pulses from section 110 to energize switch 84 through section 110 and output section 114 only when a positive going excursion of the wave from phase shifter 128 appears and to de-energize switch 84 only when a negative excursion of the output of phase shifter 128 occurs so that the phase shift of the alternating current supplied the transformer 24 during the start-up and shutdown of the transformer is accurately controlled. The precise phase shift is preferably chosen to minimize input current to the transformer and depends upon the transformer design and the value of the condenser 42. In the design selected for optimum operation, condenser 42 discharges at least partially during the portion of the 60 cycle wave when the rectifier 44 is nonconducting and magnetron 16 is conducting. Under these conditions, values are chosen such that a phase shift of 90° of the phase shifter 128 produces substantially reduced starting current surges to the power supply 22 thereby reducing peak currents which might otherwise damage interlock switches or blow fuses and reduces power line interference to radios or television sets.

The de-energization of the transformer 24 only during a negative going excursion of the output of phase shifter 128 insures the residual flux in the transformer 24 will be in the reverse direction from that produced by starting current and, hence, the possibility that the transformer will be driven into saturation and drawing large peak currents during start-up due to residual transformer core flux during repeated start-up program sequences is avoided.

A light 130, positioned in oven cavity 10, is energized by switch 132 ganged to switch 58 to turn on light 130 when door 14 is open. If desired, an auxiliary switch 134 may be manually closed to turn light 130 on during cooking when door 14 is closed to observe the oven interior through a transparent glass over apertured metal in the front of door 14.

Display 122 as shown in FIG. 2 is a flat glass panel having touch pads indicated at 140 for numbers and cooking functions, a digital read-out section 142 and individual lights 144 for cook, 146 for hold, 148 for defrost, 150 for slow cook, and 152 for timer. The panel 122 is thus cleanable easily and does not attract dirt and grease from cooking activities.

The pads 140 are actuated by touching with a finger which reduces the level of a signal from the 100 KHz computer clock supplied to level detectors in encoder 124 connected through separate lines to each of the pads 140. Each particular pad level detected causes a read-only memory in encoder 124 to send a digital code to the digital computer 110, coded with the identity of the pad sensed, which stores the code of the number or function.

During normal operation, digital display 142 reads the time of day from the computer clock. When a particular function is pushed, such as defrost, slow cook or timer, the computer 110 records that function, and when particular numbers are pushed, it records the number of seconds for which that function is to be performed. In addition, for particular functions, a special condition is also supplied by the computer. For example, if the defrost function and time pads are touched, the digital computer will supply a series of on-off pulses to the switch 86 through the output section 114. For example, twenty seconds on and twenty seconds off for the total number of seconds are supplied to the computer by selecting the particular numbers on the display board and during this period a digital code sent through driver 120 lights area 144 labelled defrost. Following expiration of this period, an automatic repeat of the function occurs with no additional signal supplied the switch 104 so that body 12 in the oven is allowed to set for the same number of seconds with the area 146 labelled hold being lit so that the defrost microwave power which portions of the body absorbed flows by thermal conduction to portions of the body which have ice crystals and, hence, absorbed less microwave energy.

Following a cooking function, such as defrost, an additional function already sequentially programmed into the computer 110 from pads 140 can occur. This sequencing of functions, which is put sequentially into the computer 110 prior to actuating the start button 90, will automatically be followed by the computer 110. During input, each of the functions, selected by pushing the pads 140 and then a series of numbers, will be lit by the decoder driver 122 which supplies signals to the panel to energize the pads. The numeral indicated by the digital display 142 during function selection, for example, will be the total number being selected to be supplied to the computer for performing the function.

When the start button 90 is pushed, the first function in the computer has its appropriate light illuminated on the pad, such as the defrost illuminator 148, and a number of seconds remaining for this function on the computer is displayed on the display section 142. For example, if the defrost function is actuated as shown, three minutes and twenty-one seconds remain to be performed in the defrost mode. Following this, the hold mode indicator 146 will automatically light, and the total number of minutes and seconds originally programmed for the subsequent cook or slow cook function will be programmed for the hold function, and the remaining time for hold will be indicated on display 142 during which time the magnetron 16 will be off. Thereafter, depending on the programmed power level, the mode indicator 150 or 152 will automatically light and the oven will be turned on and will operate at the selected power level for the total number of minutes and seconds originally programmed, and the remaining time for the function will be indicated on display 142 after which the magnetron 16 will be shut off.

This completes the description of the embodiments of the invention disclosed herein. However, many modifications thereof will be apparent to persons skilled in the art without departing from the spirit and scope of the invention. For example, any desired form of display media, such as those used in minicomputers, can be used, and any desired microwave generator, power supply or digital computer circuitry can be used. Accordingly, it is intended that this invention be not limited to the particular details illustrated herein, except as defined by the appended claims.

What is claimed is:

1. A microwave heating system comprising:
   means comprising a microwave generator energized by a power supply comprising a saturable transformer for supplying microwave energy to a multimode cavity having a movable closure member;
   a control system for connecting a source of alternating current power to said power supply transformer at a first predetermined phase of said alternating current;
   disconnecting said alternating current power from said transformer at a second predetermined phase of said alternating current power which is opposite in polarity to the polarity of said first phase; and
   the clock frequency of said control system being substantially higher than the frequency of the power source.

2. The system in accordance with claim 1 wherein said control system comprises means for sensing a zero voltage phase of said alternating current power and for connecting said power supply to said alternating current supply at said first predetermined phase after a predetermined number of cycles of said clock frequency.

3. The system in accordance with claim 2 wherein said controlling means comprises means mechanically actuated by said closure member.

4. The system in accordance with claim 1 wherein said means for connecting said power supply to said alternating current at a predetermined phase of said alternating current comprises means for supplying a coincidence detector with a signal derived from said alternating current source.

5. The system in accordance with claim 4 wherein said phase of de-energization of said transformer is digitally timed.

6. The method of heating a microwave body comprising:
   positioning said body in a multimode cavity through a movable closure member;
   connecting a power supply comprising a saturable transformer for energizing a source of microwave energy for said multimode cavity to a source of alternating current power at a first predetermined phase of said alternating current power by a digitally controlled switch; and
   disconnecting said transformer from said source of alternating current power at a second predetermined phase of said alternating current power which is opposite in polarity to the polarity of said first phase.

7. The method in accordance with claim 6 wherein said steps of connecting and disconnecting said power supply comprise manually actuating a plurality of positions on a panel in a predetermined sequence.

8. The method in accordance with claim 6 wherein said steps of connecting and disconnecting said supply for said microwave energy source comprises a semiconductor relay actuated following actuation of at least one mechanical switch.

9. The method in accordance with claim 8 wherein said mechanical switch is actuated by said closure member.

10. The method in accordance with claim 8 wherein a plurality of switches mechanically actuated by said cl closure member de-energize said semiconductor relay when said door is open.

* * * * *